(12) United States Patent
Kato et al.

(10) Patent No.: US 7,603,930 B2
(45) Date of Patent: Oct. 20, 2009

(54) ROTARY TABLE APPARATUS

(75) Inventors: Heizaburo Kato, Shizuoka (JP);
Masaaki Hori, Shizuoka (JP);
Katsuyuki Iida, Shizuoka (JP)

(73) Assignee: Sankyo Seisakusho Co., Tokyo (JP)

( * ) Notice: Subject to any disclaimer, the term of this patent is extended or adjusted under 35 U.S.C. 154(b) by 720 days.

(21) Appl. No.: 11/250,904

(22) Filed: Oct. 14, 2005

(65) Prior Publication Data
US 2006/0089089 A1    Apr. 27, 2006

(30) Foreign Application Priority Data
Oct. 15, 2004    (JP)    ............... JP 2004-301436

(51) Int. Cl.
*B23B 7/04*    (2006.01)
*B23B 29/32*    (2006.01)

(52) U.S. Cl. ............... 74/813 R; 269/58; 269/61; 409/168

(58) Field of Classification Search ............... 74/813 R, 74/816, 820, 813 C; 269/56, 58, 60, 61, 269/66; 409/168; 29/281.1
See application file for complete search history.

(56) References Cited

U.S. PATENT DOCUMENTS

| | | | |
|---|---|---|---|
| 2,445,016 A | | 7/1948 | Bentley |
| 3,786,721 A | * | 1/1974 | Reda ............... 409/165 |
| 4,080,849 A | * | 3/1978 | Benjamin et al. ......... 74/813 R |
| 4,568,070 A | * | 2/1986 | Severt ............... 269/60 |
| 4,606,654 A | * | 8/1986 | Yatsu et al. ............... 384/447 |
| 5,239,160 A | | 8/1993 | Sakura et al. |
| 5,412,174 A | | 5/1995 | Saeda et al. |
| 2002/0048420 A1 | * | 4/2002 | Kato ............... 384/618 |

FOREIGN PATENT DOCUMENTS

| | | |
|---|---|---|
| DE | 29 18 251 | 1/1980 |
| DE | 102 38 372 A1 | 3/2004 |
| DE | 102 59 215 A1 | 7/2004 |
| JP | 2004-160642 | 6/2004 |

OTHER PUBLICATIONS

European Search Report dated Dec. 22, 2005.
First Office Action in the counterpart Chinese Patent Application dated Oct. 19, 2007.
English Translation of First Office Action in the Counterpart Chinese Patent Application dated Oct. 19, 2007.
Examination Report dated Jun. 29, 2006.

* cited by examiner

*Primary Examiner*—Richard WL Ridley
*Assistant Examiner*—Thomas Diaz
(74) *Attorney, Agent, or Firm*—Nutter McClennen & Fish LLP; John J. Penny, Jr.

(57) ABSTRACT

A small-sized, lightweight rotary table apparatus is provided. The rotary table apparatus has: a support rest for rotatably supporting a rotary table; and a base for turnably supporting, in a cantilever fashion, the support rest by a shaft element, which is protrudingly formed on the support rest, being inserted into a hole provided in the base. The shaft element has formed therein a hollow section for accommodating at least a portion of a drive mechanism for rotating the rotary table.

10 Claims, 13 Drawing Sheets

ROTARY TABLE APPARATUS

CROSS-REFERENCE TO RELATED APPLICATIONS

The present application claims priority upon Japanese Patent Application No. 2004-301436 filed on Oct. 15, 2004, which is herein incorporated by reference.

BACKGROUND OF THE INVENTION

1. Field of the Invention

The present invention relates to rotary table apparatuses.

2. Description of the Related Art

Machining centers, such as the machining center 90 shown in the perspective view of FIG. 13, have conventionally been used for machining mechanical parts. The illustrated machining center 90 is provided with, for example, a worktable 91 that can move horizontally in the Z direction, and a column 92 that holds a tool T such that it is movable in a vertical plane formed in the X and Y directions. In this way, a degree of freedom of machining in three directions that are orthogonal to one another is achieved.

In recent years, to further increase the degree of freedom of machining, the worktable 91 is further provided thereon with a rotary table apparatus 95 having a placement surface that can rotate about two axes. In this way, the machining center is provided with 5 degrees of freedom of machining, thereby allowing for a more complicated processing.

The perspective view of FIG. 14 shows an example of the rotary table apparatus 95. The rotary table apparatus 95 has a rotary table 96 having a circular placement surface 96a on which a workpiece W is placed, a support rest 97 that rotatably supports the rotary table 96, and a base 98 that turnably supports both sides of the support rest 97. The rotary table 96 and the support rest 97 are each provided with a respective drive mechanism (not shown), and these drive mechanisms make the support rest 97 turn so as to tilt the placement surface 96a and/or make the rotary table 96 rotate so as to cause rotation of the placement surface 96a about its center, thereby allowing the tool T on the column 92 to work on the workpiece W placed on the placement surface 96a. (See, for example, pages 8-9 and FIG. 1 of JP 2004-160642 A.)

As shown in the figure, this type of rotary table apparatus 95 adopts a both-side support structure in which the support rest 97 is supported at both sides thereof. Therefore, it is difficult to reduce the size of the base 98, and due to this fact, such a rotary table apparatus 95 could only be installed on a large-scale machining center 90. Thus, it has been difficult to increase the degree of freedom in machining small-sized parts that are mainly machined in small-sized machining centers.

SUMMARY OF THE INVENTION

The present invention was arrived in light of the foregoing issues, and it is an object thereof to achieve a small-sized and lightweight rotary table apparatus having a support rest that rotatably supports a rotary table, and a base that turnably supports the support rest.

An aspect of the present invention for achieving the above object is a rotary table apparatus comprising: a support rest for rotatably supporting a rotary table; and a base for turnably supporting, in a cantilever fashion, the support rest by a shaft element that is protrudingly formed on the support rest being inserted into a hole provided in the base. The shaft element has formed therein a hollow section for accommodating at least a portion of a drive mechanism for rotating the rotary table.

Features of the present invention other than the above will become clear through the description of the present specification with reference to the accompanying drawings.

BRIEF DESCRIPTION OF THE DRAWINGS

For a more complete understanding of the present invention and the advantages thereof, reference is now made to following description taken in conjunction with the accompanying drawings wherein:

FIG. 8 shows the surroundings of a roller 81 adjacent to the roller 81 shown in FIG. 7;

DETAILED DESCRIPTION OF THE INVENTION

Figure 1:
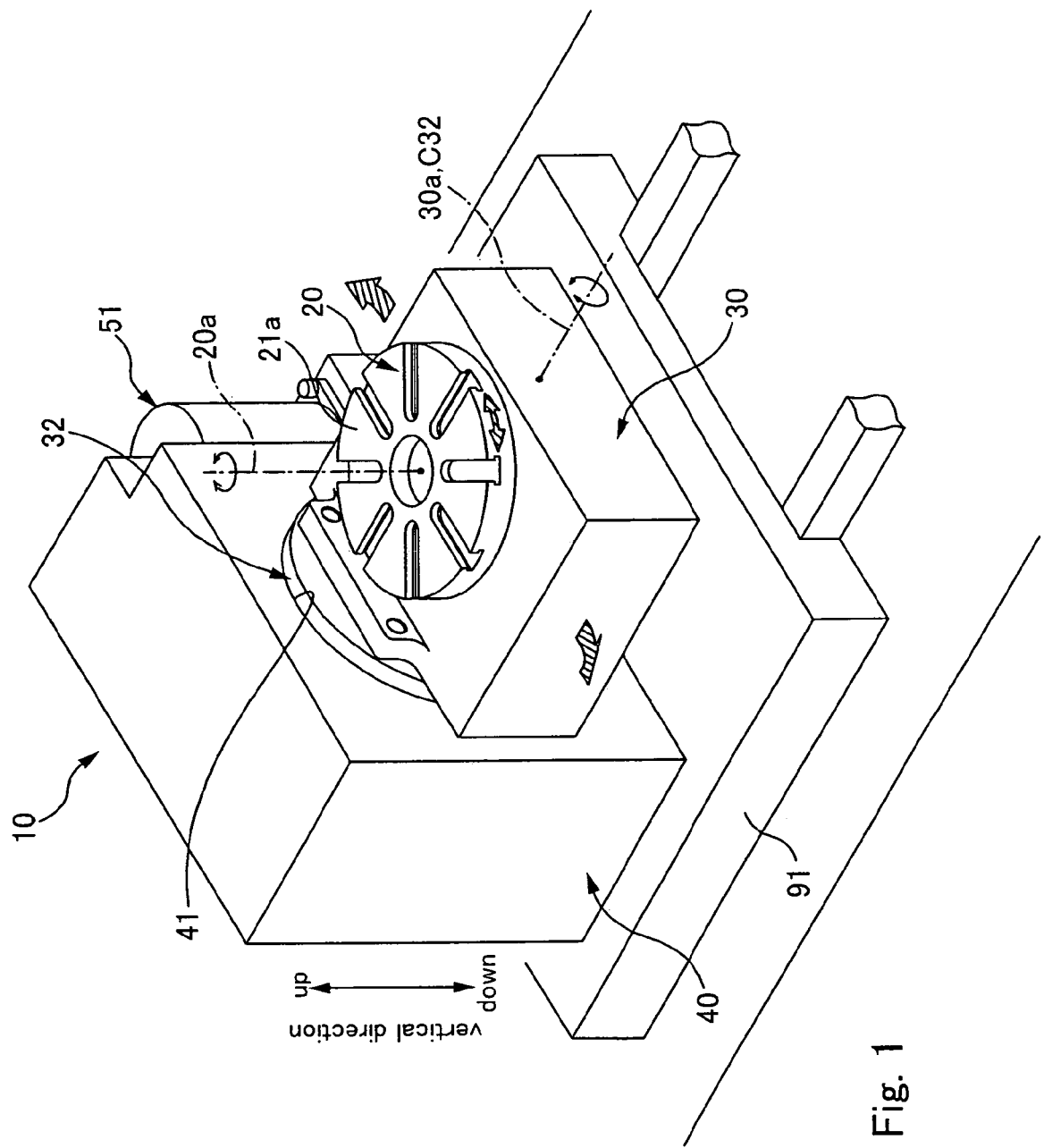
FIG. 1 is a perspective view for describing a rotary table apparatus 10 according to a first embodiment of the present invention.

At least the following matters will be made clear by the present specification with reference to the accompanying drawings.

An aspect of the present invention is a rotary table apparatus comprising: a support rest for rotatably supporting a rotary table; and a base for turnably supporting, in a cantilever fashion, the support rest by a shaft element that is protrudingly formed on the support rest being inserted into a hole provided in the base, the shaft element having formed therein a hollow section for accommodating at least a portion of a drive mechanism for rotating the rotary table.

With such a rotary table apparatus, since the base supports the support rest for the rotary table in a cantilever fashion, the size of the base can be reduced compared to a both-side support-type base, and thus, the rotary table apparatus can be made small and lightweight as a whole.

Further, the inner section of the shaft element, which tends to become a dead space, can effectively be used for accommodating at least a portion of the drive mechanism of the rotary table. As a result, the accommodation space which is usually provided inside the support rest can be made small, and thus, the rotary table apparatus can be reduced in size as a whole.

In the above rotary table apparatus, the shaft element may be formed protruding sideward from the support rest.

With such a rotary table apparatus, the support rest can be supported in a cantilever fashion by positioning it on the side of the base. In the cantilever-support configuration, however, since the sideward-facing shaft element is inserted into the hole formed in the base, an excessive support moment is applied to the hole for supporting the entire weight of the support rest, and thus, the support rest tends to bend downward. This may impair the positioning precision of the rotary table apparatus as a whole. According to the present invention, however, since the drive mechanism is accommodated inside the shaft element, the center of gravity of the entire support rest, including the drive mechanism, is located closer to the hole, thereby allowing the support moment to be suppressed to a small value. As a result, it becomes possible to suppress the downward bending of the support rest to a small amount, and thus improve the positioning precision of the rotary table apparatus as a whole. Further, in cases of providing in the hole a bearing for supporting the shaft element, it becomes possible to use a relatively small bearing because the support moment is suppressed. This achieves further downsizing and weight reduction of the rotary table apparatus.

In the above rotary table apparatus, the shaft element may be turnably supported about an axis thereof by a bearing installed to the hole; and the drive mechanism may be arranged extending across the position of installation of the bearing in the direction of the axis of the shaft element.

With such a rotary table apparatus, the drive mechanism is arranged extending across (or, on either sides of) the position of installation of the bearing in the axial direction of the shaft element. Therefore, it is possible to set the center of gravity of the support rest, which includes the rotary table and the drive mechanism, close to the position of installation of the bearing which supports the support rest, and thus, the support moment applied to the bearing can be suppressed to a small value. As a result, it becomes possible to improve the positioning precision of the rotary table apparatus as a whole. Further, since a relatively small-sized bearing can be used, it becomes possible to further reduce the size and weight of the rotary table apparatus.

In the above rotary table apparatus, the bearing may be a cross roller bearing; and, of among grooves in which rolling elements of the cross roller bearing roll, a groove on the side of the shaft element may be formed directly in the shaft element.

In such a rotary table apparatus, a cross roller bearing is used as the bearing. By providing a single cross roller bearing, it becomes possible to receive both the radial load and the thrust load applied to the shaft element. Therefore, only a single bearing is needed instead of two bearings for receiving the two types of loads as in usual cases. As a result, the dimension in the axial direction of the shaft element can be reduced, and thus, further downsizing of the rotary table apparatus can be achieved.

Further, a cross roller bearing can effectively resist support moments, and can therefore achieve a great effect in cantilever-support structures in which a large support moment tends to occur and can effectively suppress bending of the support rest due to the cantilever-support configuration.

Moreover, the groove of the cross roller bearing is directly formed in the shaft element. Accordingly, the inner race of the cross roller bearing is omitted. This allows for a reduction, in the radial direction, in dimension of the cross roller bearing, and as a result, it becomes possible to further reduce the size and weight of the rotary table apparatus.

Furthermore, since the groove is directly formed in the shaft element, it becomes possible to machine the groove with high precision with respect to the center of turning of the shaft element, by machining the shaft element and the groove at the same time (i.e., matching the machining timing thereof). As a result, the turning precision of the support rest with respect to the base can be improved.

In the above rotary table apparatus, the rotary table may have a rotation shaft protrudingly formed concentric with a center of rotation of the rotary table; the rotation shaft may be accommodated in an inner space provided in the support rest; the inner space may be in communication with the hollow section; and a motor that rotates a drive-rotation shaft thereof according to a power that has been supplied, and a cam mechanism for rotating the rotation shaft according to the rotation of the drive-rotation shaft may be accommodated, as the drive mechanism, in the inner space and the hollow section.

With such a rotary table apparatus, since the hollow section is in communication with the inner space which accommodates the rotation shaft of the rotary table, it becomes possible to rotate the rotary table using the drive mechanism whose at least one portion is accommodated in the hollow section.

Further, since the drive mechanism is made up of a motor and a cam mechanism, the rotary table can be driven to rotate with high precision.

In the above rotary table apparatus, the motor and the cam mechanism may be accommodated inside the inner space and the hollow section without any of their portions protruding outside from the inner space and the hollow section.

With such a rotary table apparatus, all of portions such as the motor and the cam mechanism, which are drive mechanisms that are generally prone to damages, can effectively be protected by being accommodated inside the inner space and the hollow section. Thus, the rotary table apparatus is less prone to breakdowns.

In the above rotary table apparatus, the motor accommodated in the hollow section may be supported by the support rest; the cam mechanism accommodated in the inner space may have cam followers that are provided on an outer circumferential surface of the rotation shaft along its circumferential direction at even intervals, and a cam that is rotatably supported on the support rest with its axis aligned with a direction orthogonal to the rotation shaft; and the rotary table may be rotated due to the motor rotating the cam, and the cam followers successively engaging with a cam surface formed in an outer circumferential surface of the cam.

With such a rotary table apparatus, due to the motor being accommodated in the hollow section, the center of gravity of the support rest can be set close to the hole. Therefore, it becomes possible to suppress the support moment applied to the hole to a small value.

In the above rotary table apparatus, the drive-rotation shaft of the motor may be arranged parallel to an axis of the cam; and a rotation transmitting element for transmitting the rotation of the drive-rotation shaft to the cam may be provided between the drive-rotation shaft and the cam.

With such a rotary table apparatus, since the rotation transmitting element transmits the rotation of the drive-rotation shaft of the motor to the cam, the degree of freedom in arranging the drive-rotation shaft and the cam can be increased.

Further, since the drive-rotation shaft and the cam are arranged so that their axes are parallel to one another, it becomes possible to use a rotation transmitting element having a relatively simple structure, such as a plurality of spur gears.

In the above rotary table apparatus, the drive-rotation shaft of the motor may be arranged aligned with the axis of the shaft element.

With such a rotary table apparatus, the motor can be accommodated with a minimum dead space when placing the motor in the hollow section of the shaft element. As a result, it becomes possible to install a large-sized motor and construct a rotary table apparatus having a high output compared to its small dimension.

In the above rotary table apparatus, the rotation transmitting element may be a plurality of gears.

With such a rotary table apparatus, it becomes possible to transmit the force to the cam while changing the number of revolutions of the drive-rotation shaft of the motor (for example, while reducing the speed of rotation) through settings of the gear ratio of the gears. Therefore, it is possible to increase the degree of freedom in selecting the rated number of revolutions of the motor that can achieve the desired number of revolutions of the rotary table.

In the above rotary table apparatus, the rotation transmitting element may be a shaft coupling; and the drive-rotation shaft and the cam may be connected, side-by-side, by the shaft coupling with their centers of rotation being matched with one another.

With such a rotary table apparatus, not only is it possible to eliminate backlash, which becomes a problem when adopting a plurality of gears as a rotation transmitting element, but problems regarding frictional losses that arise when using, as the rotation transmitting element, a wound-type transmitting device made up of pulleys and an endless belt can also be eliminated. As a result, the precision of transmitting the drive-rotation force from the motor to the rotary table becomes excellent.

In the above rotary table apparatus, the rotation shaft of the rotary table and the axis of the shaft element of the support rest may be orthogonal to one another.

With such a rotary table apparatus, the support rest can be turned about a direction orthogonal to the rotation shaft of the rotary table.

In the above rotary table apparatus, the rotation shaft of the rotary table may be supported on the support rest via a cross roller bearing; and, of among grooves in which rolling elements of the cross roller bearing roll, a groove on the side of the rotation shaft may be formed directly in the rotation shaft.

In such a rotary table apparatus, a cross roller bearing is used as the bearing. By providing a single cross roller bearing, it becomes possible to receive both the radial load and the thrust load applied to the rotation shaft. Therefore, only a single bearing is needed instead of two bearings for receiving the two types of loads as in usual cases. As a result, the dimension in the direction of the rotation shaft of the rotary table can be reduced, and thus, further downsizing of the rotary table apparatus can be achieved.

Further, a cross roller bearing can effectively resist support moments, and can therefore achieve a great effect in cantilever-support structures in which a large support moment tends to occur and can effectively suppress bending of the support rest due to the cantilever-support configuration.

Moreover, the groove of the cross roller bearing is directly formed in the rotation shaft. Accordingly, the inner race of the cross roller bearing is omitted. This allows for a reduction, in the radial direction, in dimension of the cross roller bearing, and as a result, it becomes possible to further reduce the size and weight of the rotary table apparatus.

Furthermore, since the groove is directly formed in the rotation shaft of the rotary table, it becomes possible to machine the groove with high precision with respect to the center of rotation of the rotation shaft, by machining the rotation shaft and the groove at the same time (i.e., matching the machining timing thereof). As a result, the rotating precision of the rotary table with respect to the support rest can be improved.

In the above rotary table apparatus, the rotary table apparatus may further comprise a drive mechanism for causing the support rest to turn about an axis of the shaft element; the drive mechanism may have cam followers that are provided on an outer circumferential surface of the shaft element along its circumferential direction at even intervals, a cam that is rotatably supported on the base with its axis aligned with a direction orthogonal to the shaft element, and a motor for rotating the cam; and the support rest may be turned with respect to the base due to the motor rotating the cam, and the cam followers successively engaging with a cam surface formed in an outer circumferential surface of the cam.

Since such a rotary table apparatus has a plurality of cam followers provided on the shaft element and a cam with which these cam followers engage, the shaft element can be turned with high precision, and thus, it becomes possible to index (or tilt) the support rest to a predetermined tilt angle with high precision.

FIRST EMBODIMENT

Figure 2:
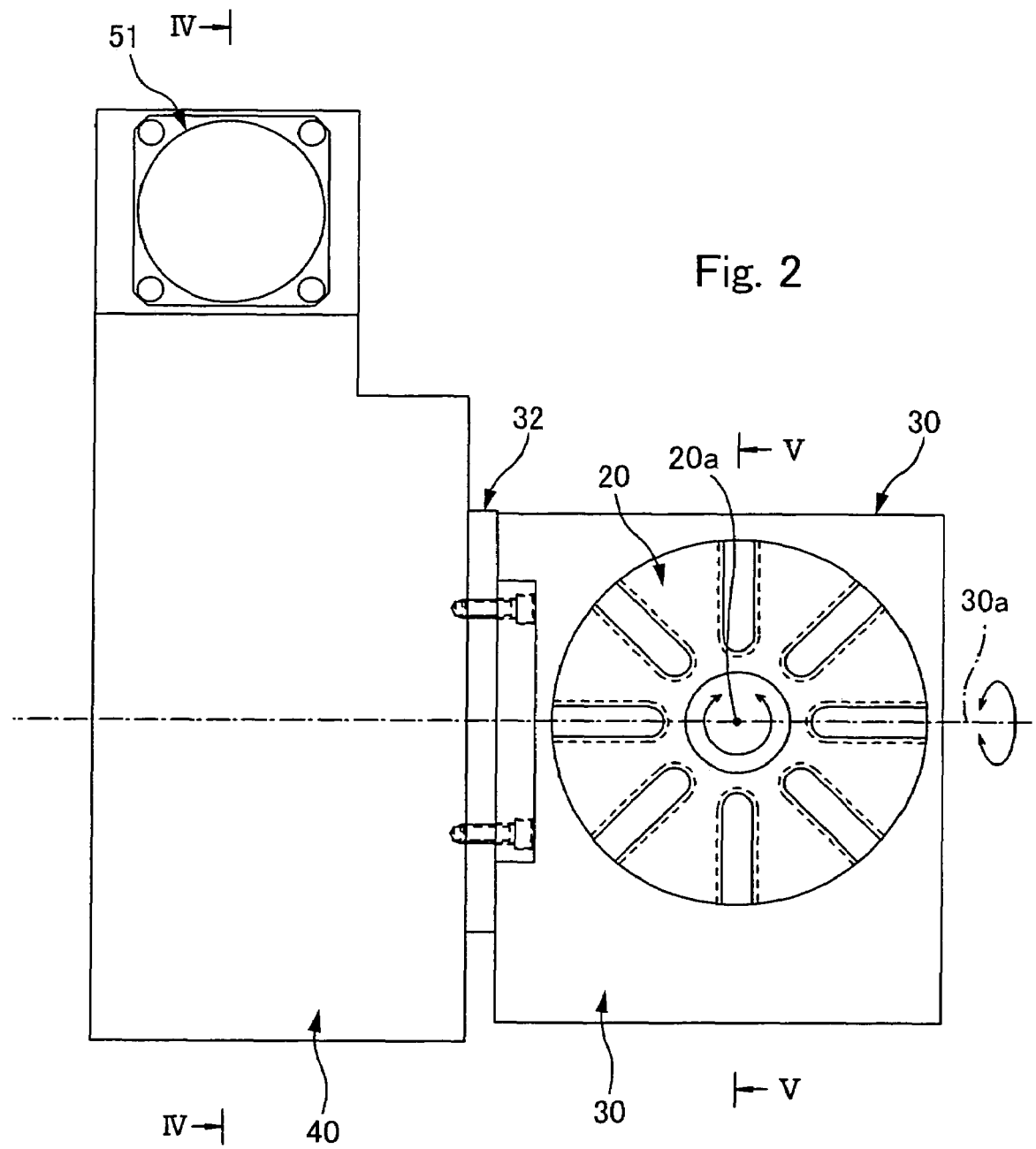
FIG. 2 is a plan view of the rotary table apparatus 10.
Figure 3:
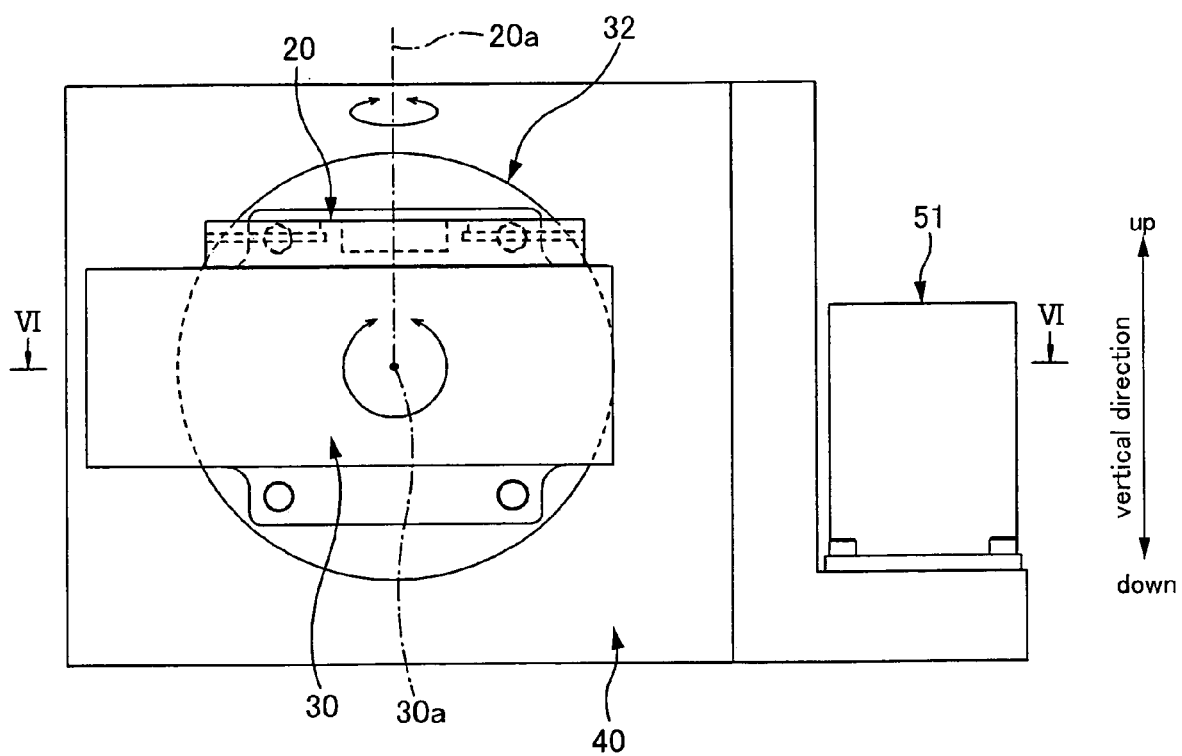
FIG. 3 is a front view of the rotary table apparatus 10.
Figure 4:
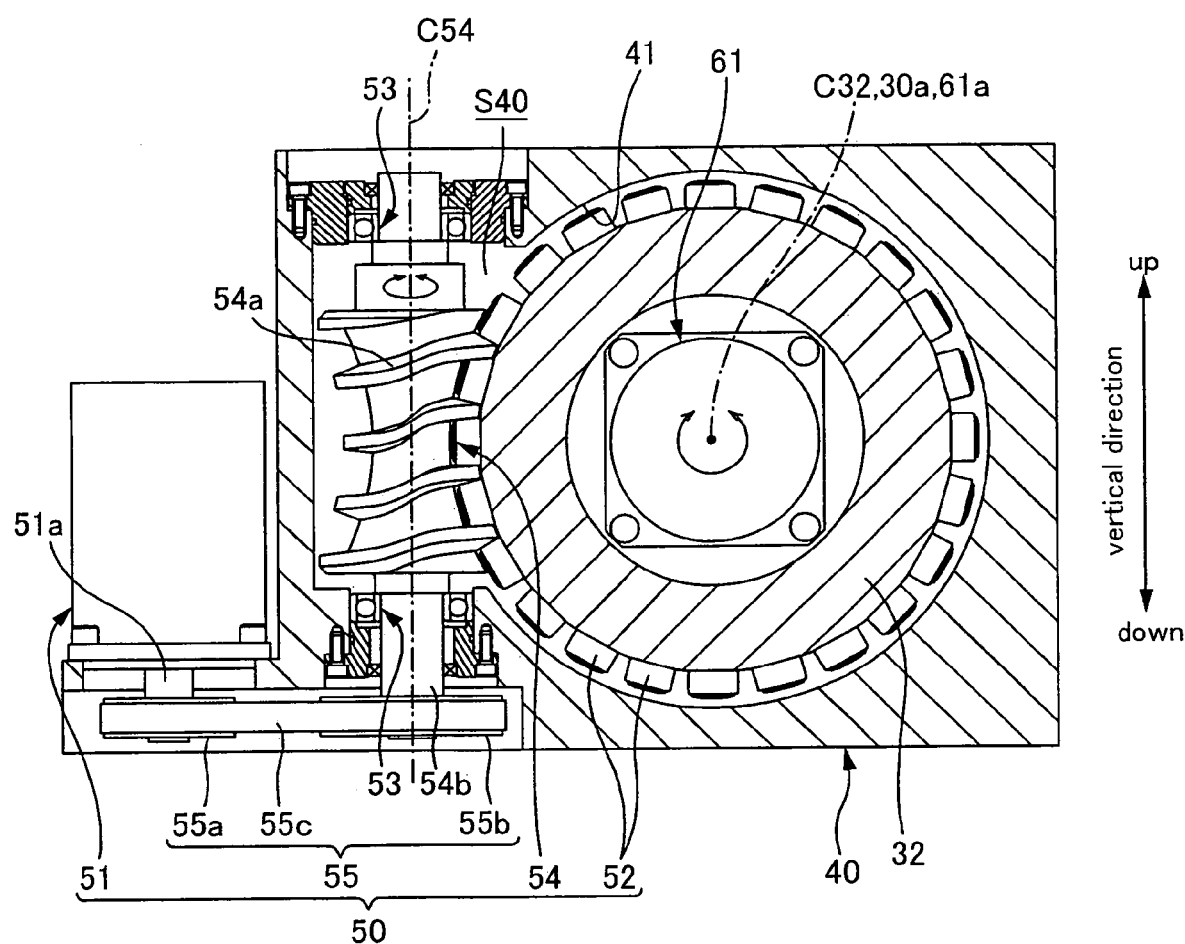
FIG. 4 is a vertical sectional view taken along line IV-IV in FIG. 2.
Figure 5:
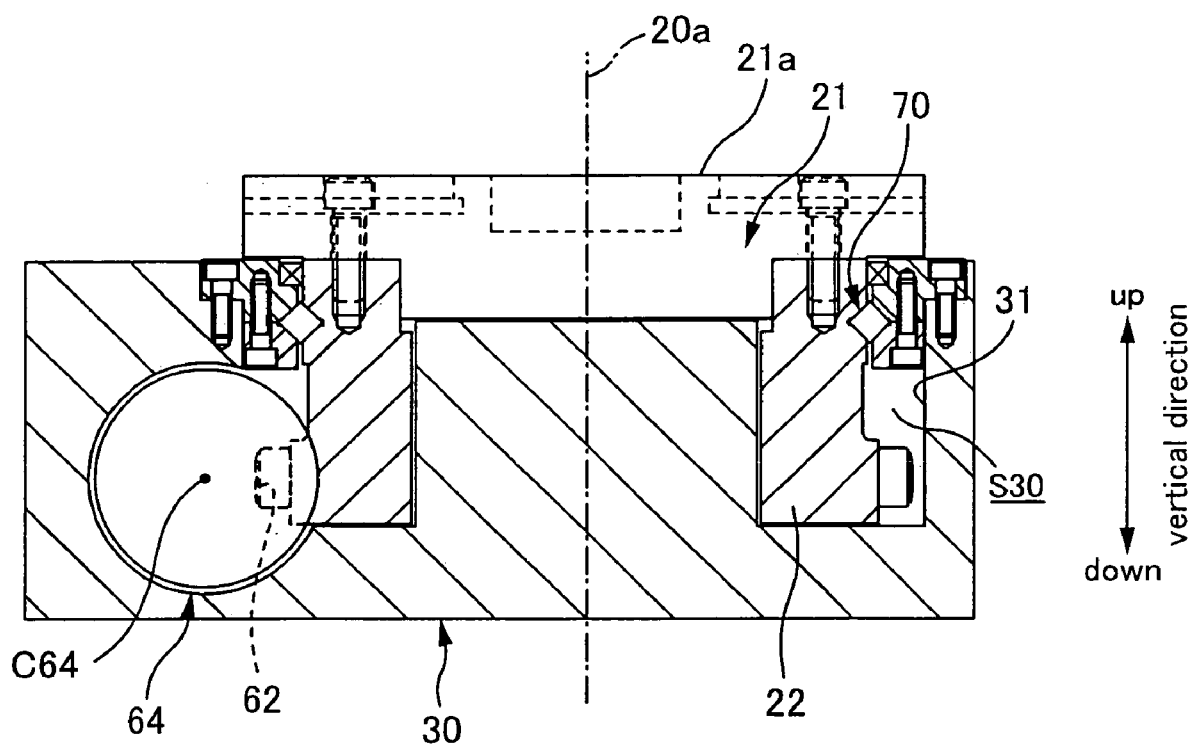
FIG. 5 is a vertical sectional view taken along line V-V in FIG. 2.
Figure 6:
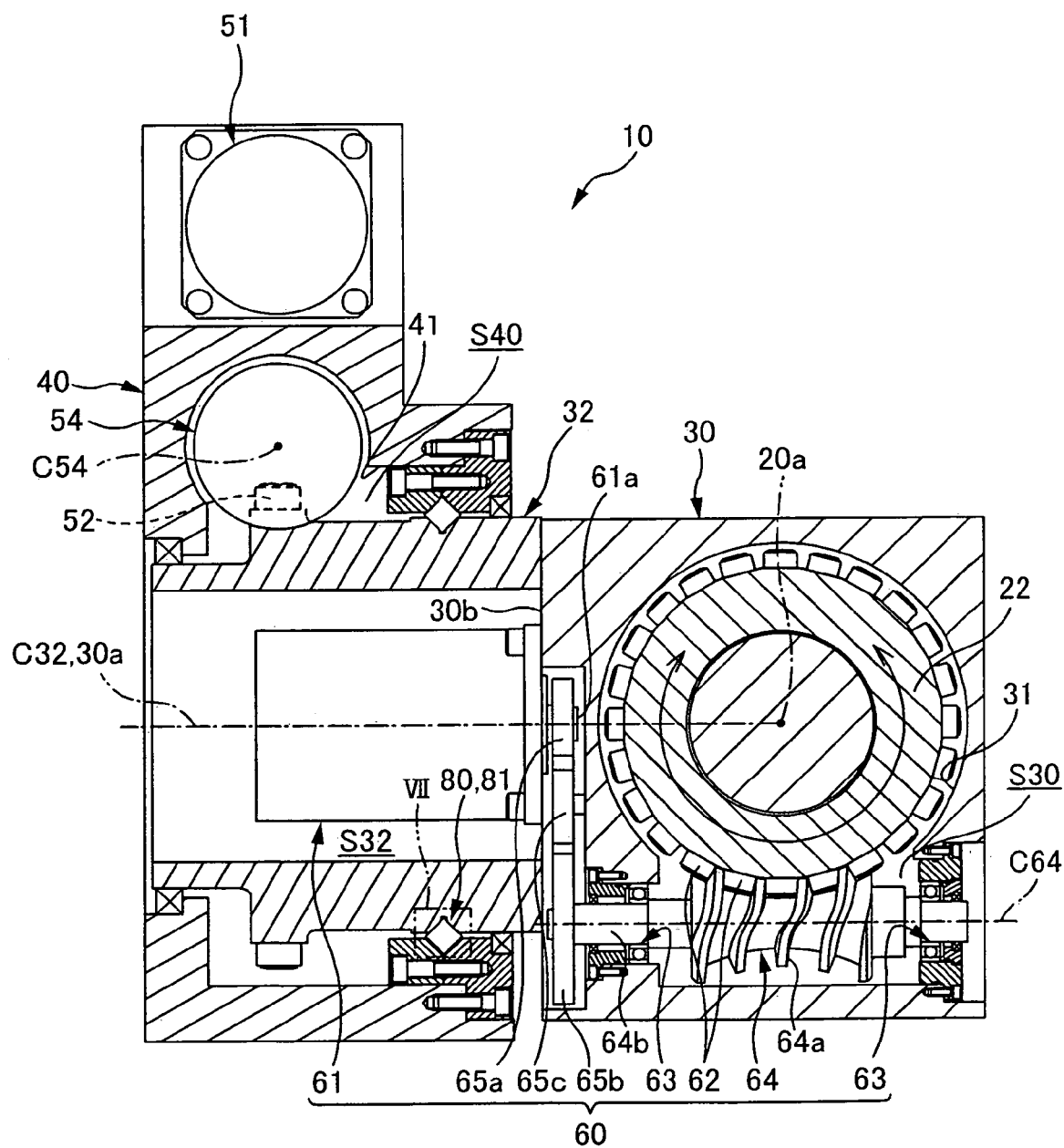
FIG. 6 is a horizontal sectional view taken along line VI-VI in FIG. 3.

FIG. 1 through FIG. 6 are diagrams for describing a rotary table apparatus 10 according to a first embodiment of the present invention. FIG. 1 is a perspective view, FIG. 2 is a plan view, FIG. 3 is a front view, FIG. 4 is a vertical sectional view taken along line IV-IV in FIG. 2, FIG. 5 is a vertical sectional view taken along line V-V in FIG. 2, and FIG. 6 is a horizontal sectional view taken along line VI-VI in FIG. 3. It should be noted that some portions of the rotary table apparatus 10 shown in FIG. 4 through FIG. 6 are depicted as a plan view or a side view.

Figure 13:
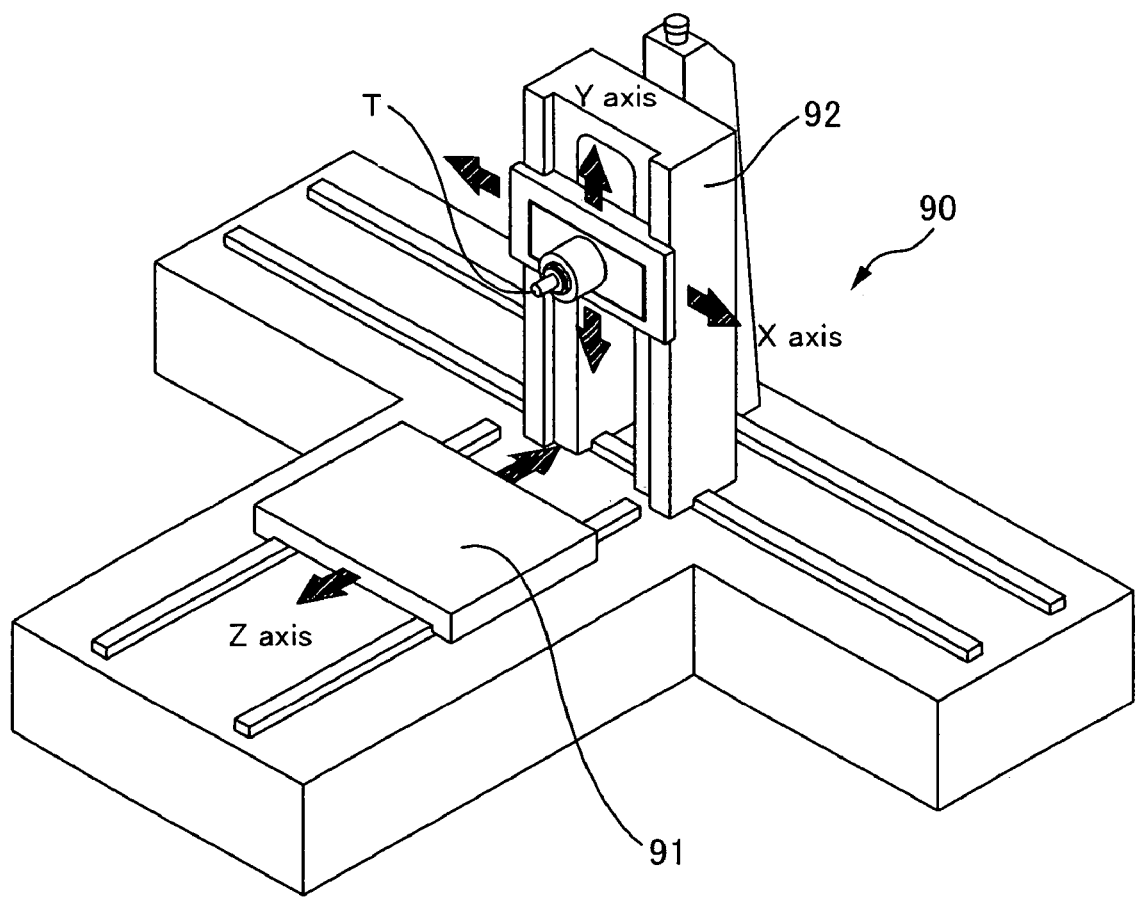
FIG. 13 is a perspective view showing an example of a machining center 90.
Figure 14:
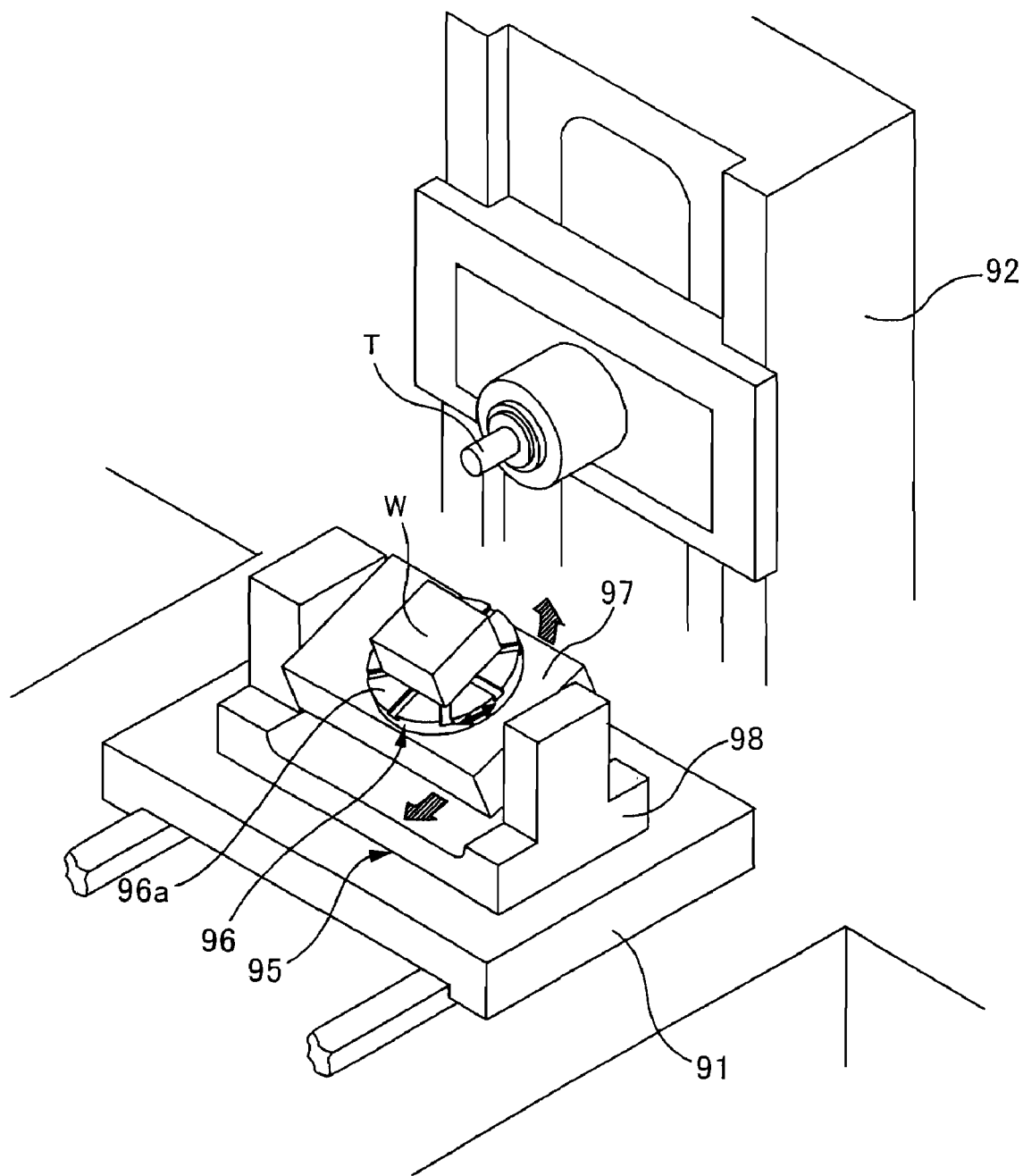
FIG. 14 is a perspective view showing a conventional rotary table apparatus 95.

The rotary table apparatus 10 of the present first embodiment can be used, for example, in the machining center 90 shown in FIG. 13 which has 3 degrees of freedom of machining, and can increase the degree of freedom of machining to 5 degrees of freedom. As described above, the machining center 90 is provided with a worktable 91 that can move horizontally in the Z direction, and a column 92 that holds a tool T such that it is movable in a vertical plane formed in the X and Y directions. By placing, on the worktable 91, the present rotary table apparatus 10 having a placement surface 21a that is rotatable about two axes as shown in FIG. 1, the degree of freedom of the machining center 90 is increased to 5 degrees of freedom.

As shown in FIG. 1 through FIG. 3, the rotary table apparatus 10 has a rotary table 20 on which a workpiece (not shown) is placed and held, a substantially rectangular-parallelepiped support rest 30 for rotatably supporting the rotary table 20 about a predetermined rotation axis 20a, and a substantially rectangular-parallelepiped base 40 for turnably supporting, in a cantilever fashion, the support rest 30 about a predetermined horizontal turn axis 30a. The apparatus 10 is configured such that the support rest 30 is turned (or tilted like a seesaw) within a tilt-angle range of, for example, ±30° from the horizontal state using, as a drive source, a first drive mechanism 50 accommodated mainly inside the base 40, and the rotary table 20 is rotated, either continuously or intermittently, over a range of, for example, 360° using, as a drive source, a second drive mechanism 60 accommodated mainly inside the support rest 30. It should be noted that the support rest 30 is supported in a cantilever fashion in order to achieve downsizing of the base 40 supporting the support rest 30.

As shown in FIG. 5, the rotary table 20 has a disk-like table section 21 whose upper surface configures the placement surface 21a for the workpiece, and a cylindrical turret section 22 (an example of a "rotation shaft") formed hanging down from the lower surface of the table section 21 concentrically with the placement surface 21a about the rotation axis 20a. The turret section 22 is accommodated inside an inner space S30 of the support rest 30 via a circular recess 31 formed in the upper surface of the support rest 30, and only the table section 21 is exposed from the circular recess 31 with its placement surface 21a exposed upwardly. A cross roller bearing 70 is interposed between the circular recess 31 and the turret section 22, and in this way, the rotary table 20 is rotatably supported about the rotation axis 20a, which is the center of the placement surface 21a. It should be noted that the cross roller bearing 70 will be described in detail further below.

On the other hand, as shown in FIG. 6, a horizontal cylindrical shaft element 32, which serves as the turn axis 30a, is formed protruding sideward from one side surface of the support rest 30. The cylindrical shaft element 32 is horizontally inserted into a circular hole 41 which is formed through the base 40 in one side surface thereof. In this way, the support rest 30 is supported by the base 40 in a cantilever fashion. It should be noted that a cross roller bearing 80 is interposed between the hole 41 and the cylindrical shaft element 32, and in this way, the support rest 30 is turnably supported by the cylindrical shaft element 32.

The mechanisms of the first drive mechanism 50, except for the motor 51 (referred to below as a "first motor"), for making the support rest 30 turn is accommodated inside an inner space S40 of the base 40 formed in communication with the hole 41 as shown in FIG. 4. That is, the inner space S40 accommodates, as a cam mechanism (referred to below as a "first cam mechanism"), a plurality of cam followers 52 provided on the outer circumferential surface of the cylindrical shaft element 32, and a globoidal cam 54 that is supported on the base 40 through a pair of bearings 53 provided at the top and the bottom of the cam 54. On the other hand, the first motor 51 for rotating the globoidal cam 54 is arranged outside and close to the inner space S40.

More specifically, the plurality of cam followers 52 are arranged along the circumferential direction of the cylindrical shaft element 32 at even intervals, and the globoidal cam 54 is arranged such that its axis C54 is aligned with the vertical direction, which is orthogonal to the axis C32 of the cylindrical shaft element 32. Further, on the outer circumferential surface of the globoidal cam 54 is formed, along its circumferential direction, a cam surface 54a whose position is displaced in the vertical direction, which is the direction of its axis. The cam followers 52 mesh with the cam surface 54a. Thus, as the globoidal cam 54 is rotated by the first motor 51, the cam followers 52 are successively moved by the cam surface 54a in the vertical direction, which is the direction of the axis, and as a result, the support rest 30 is turned along with the cylindrical shaft element 32.

It should be noted that transmission of the drive-rotation force from the first motor 51 to the globoidal cam 54 is achieved by appropriate rotation transmitting elements, and in the present first embodiment, a wound-type motion-transmitting device 55, such as the one shown in FIG. 4, is used. More specifically, the drive-rotation shaft 51a of the first motor 51 and the end 54b of the globoidal cam 54 are provided, respectively, with pulleys 55a and 55b, and an endless belt 55c is wound around these pulleys 55a and 55b. The rotation transmitting element, however, is not limited to this, and for example, it is possible to adopt a gear-wheel-type motion-transmitting device made up of a plurality of spur gears that mesh with one another.

On the other hand, the second drive mechanism 60 for rotating the rotary table 20 is accommodated inside the inner space S30 of the support rest 30 and an inner-circumferential space S32 of the cylindrical shaft element 32 (this is referred to below as a "hollow section"), as shown in FIG. 6. That is, the inner space S30 and the hollow section S32 are in communication with one another, and the second drive mechanism 60 is accommodated therein extending across these two spaces S30 and S32. A portion (i.e., a second motor 61 described later) of the second drive mechanism 60, which usually is accommodated inside the inner space S30 of the support rest 30, is instead accommodated inside the hollow section S32. Therefore, it is possible to achieve downsizing of the outer dimension of the support rest 30.

As shown in FIG. 6, however, since the support rest 30 is supported in a cantilever fashion by the cross roller bearing 80 of the cylindrical shaft element 32, a large support moment is applied to the cross roller bearing 80 for supporting the weight of the support rest 30. As a result, the support rest 30 is prone to bend downward (the direction passing through the paper face of FIG. 6), and thus, there is a possibility that the positioning precision of the rotary table apparatus 10 is impaired as a whole.

In view of the above, in the present first embodiment, the center of gravity of the second drive mechanism 60 is arranged as close as possible to the cross roller bearing 80 in order to suppress the support moment to a small value. More specifically, the cam mechanism (referred to below as a "second cam mechanism") of the second drive mechanism 60 is accommodated inside the inner space S30, whereas the motor 61 (referred to below as a "second motor 61") of the second drive mechanism 60 is accommodated inside the hollow section S32, whose major portion is located on the other side of the inner space S30 across the cross roller bearing 80, so as to balance the weight on both sides of the cross roller bearing 80. In this way, it is possible to suppress the support moment to a small value as well as solve the problem of deterioration in positioning precision, and in some cases, it will be possible to use a small-sized cross roller bearing 80 having a smaller load rating.

With reference to FIG. 6, the arrangement of the second drive mechanism 60 is described in further detail. The second cam mechanism accommodated inside the inner space S30 of the support rest 30 is provided with a plurality of cam followers 62 provided on the outer circumferential surface of the turret section 22 of the rotary table 20, and a globoidal cam 64 of which both ends are supported by bearings 63 provided on the support rest 30. The globoidal cam 64 is arranged so that its outer circumferential surface faces the outer circumferential surface of the turret section 22 orthogonally, and so that the axis C64 of the globoidal cam 64 is in the horizontal direction, which is parallel to the axis C32 of the cylindrical shaft element 32. Further, on the outer circumferential surface of the globoidal cam 64 is formed, along its circumferential direction, a cam surface 64a whose position is displaced in the direction of the axis. The cam followers 62 of the turret section 22 mesh with the cam surface 64a.

On the other hand, the second motor 61 accommodated inside the hollow section S32 of the cylindrical shaft element 32 is bolted to a side surface 30b of the support rest 30 facing the hollow section S32, in a state where the drive-rotation shaft 61a of the second motor 61 is faced toward the support rest 30 and aligned with the axis C32 of the cylindrical shaft element 32. One end 64b of the globoidal cam 64 is located on the side of the drive-rotation shaft 61a, and this end 64b and the drive-rotation shaft 61a are arranged parallel to each other. Therefore, these two elements are connected via three spur gears 65a, 65b, and 65c which serve as rotation transmitting elements. More specifically, the spur gear 65b and the spur gear 65a are fixed respectively to the end 64b and the drive-rotation shaft 61a, and an intermediate spur gear 65c supported on the support rest 30 is arranged in between these two gears. The drive-rotation force is transmitted from the second motor 61 to the globoidal cam 64 via the intermediate spur gear 65c.

As the drive-rotation force of the second motor 61 is transmitted to the globoidal cam 64 via the spur gears 65a, 65b, and 65c and the globoidal cam 64 is rotated, the cam followers 62 are successively moved by the cam surface 64a in the direction of the axis C64 of the globoidal cam 64, and as a result, the turret section 22 is rotated and thereby the rotary table 20 is rotated as well.

It should be noted that by adopting the a plurality of gears 65a, 65b, and 65c as the rotation transmitting elements, it becomes possible to transmit the force to the globoidal cam 64 while changing the number of revolutions of the drive-rotation shaft 61a of the second motor 61 (for example, while reducing the speed of rotation) through settings of the gear ratio of these gears 65a, 65b, and 65c. Therefore, it is possible to increase the degree of freedom in selecting the rated number of revolutions of the second motor 61 that can achieve the desired number of revolutions of the rotary table 20.

Further, by aligning the drive-rotation shaft 61a of the second motor 61 with the axis C32 of the cylindrical shaft element 32 when placing the second motor 61 into the hollow section S32 of the cylindrical shaft element 32 as described above (see FIG. 4), it is possible to accommodate the second motor 61 while effectively suppressing occurrence of a dead space. As a result, it becomes possible to install a relatively large motor and achieve a rotary table apparatus 10 having a high output compared to its small overall dimension.

The cross roller bearings 70 and 80 are described next. The cross roller bearings 70 and 80 shown in FIG. 5 and FIG. 6 are one type of bearing, and is for rotatably supporting a shaft member such as the cylindrical shaft element 32 (or the turret section 22) on a support member such as the base 40 (or the support rest 30). These cross roller bearings 70 and 80 have the function of supporting, at once, both the thrust load and the radial load applied to the shaft member. Using cross roller bearings, it is possible to omit providing separate bearings for the respective loads. Therefore, this achieves the effect of allowing downsizing of the dimension in the axial direction of the shaft member. As a result, it is possible to achieve a further downsizing of the rotary table apparatus 10.

Below, the cross roller bearing 80 provided between the base 40 and the cylindrical shaft element 32 shown in FIG. 6 is described as an example. It is needless to say that the structure of the cross roller bearing 70 provided between the support rest 30 and the turret section 22 is the same.

Figure 7:
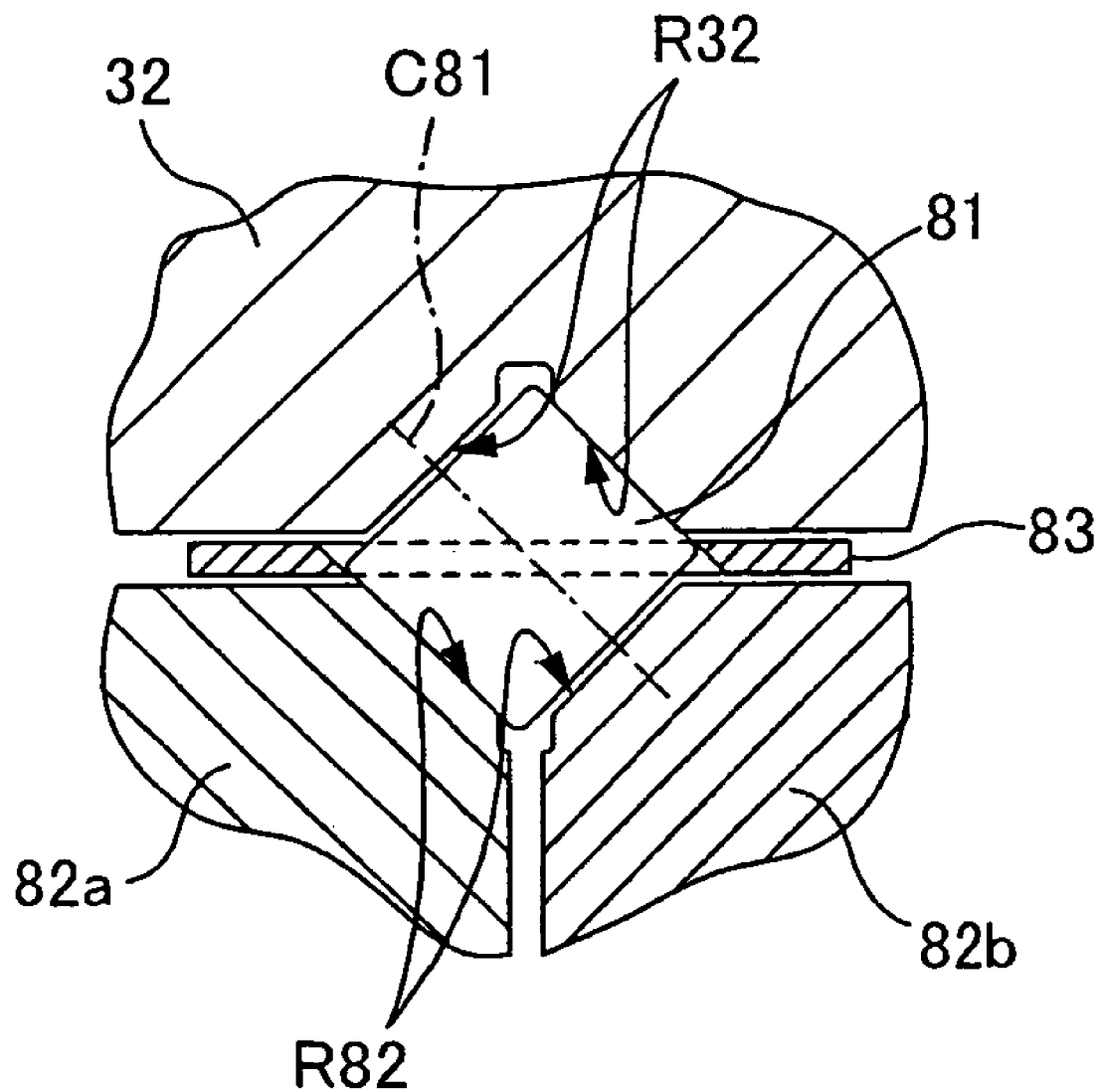
FIG. 7 is an explanatory diagram of a cross roller bearing 80, showing in enlargement the portion VII of FIG. 6.

FIG. 7 shows in enlargement the portion VII of FIG. 6. FIG. 8 shows, in the same format, the surroundings of a roller 81 adjacent to the roller 81 shown in FIG. 7. As shown in FIG. 6, the cross roller bearing 80 adopts, as rolling elements, a plurality of rollers 81 each having a cylindrical shape, for example. These rollers 81 are arranged in an annular gap formed between the cylindrical shaft element 32, which is the shaft member, and the base 40, which is the support member, at even intervals along the circumferential direction of the annular gap. The rollers 81 roll between a V-shaped groove R32 that is provided in an inner-race member (the example of FIG. 7 shows a configuration in which the inner-race member is omitted) attached to the cylindrical shaft element 32 on the inner side, and a V-shaped groove R82 that is provided in a pair of outer-race members 82a and 82b attached to the base 40 on the outer side. It should be noted that the rollers 81 are arranged with their rolling axes C81 sloped toward the center of turning (axis C32) of the cylindrical shaft element 32, and are disposed such that the sloping directions of the rolling axes C81 of adjacent rollers 81 are opposite from one another as shown in FIG. 7 and FIG. 8. In this way, it becomes possible to support, at once, both the thrust load and the radial load applied to the cylindrical shaft element 32. It should be noted that, between the inner-race member and the outer-race members 82a and 82b, a holding device 83 is provided for holding the rollers 81 that roll therebetween.

In the first embodiment, the V-shaped groove R32 is formed directly into the cylindrical shaft element 32 in order to omit the inner-race member. With such a configuration, it becomes possible to machine the V-shaped groove R32 with high precision with respect to the center of turning (axis C32) of the cylindrical shaft element 32, by machining the cylindrical shaft element 32 and the V-shaped groove R32 at the same time (i.e., matching the machining timing thereof). As a result, the turning precision of the support rest 30 with respect to the base 40 can be improved.

Further, since the inner-race member is omitted, the dimension of the cross roller bearing 80 can be reduced in the radial direction, and thus, it is possible to achieve further downsizing of the rotary table apparatus 10.

Moreover, since the cross roller bearing 80 can also effectively resist the support moment, it achieves a significant effect in cantilever-support structures in which large support moments tend to occur, and thus, it is possible to effectively suppress the downward bending of the support rest 30 that is caused due to the cantilever-support configuration.

SECOND EMBODIMENT

Figure 9:
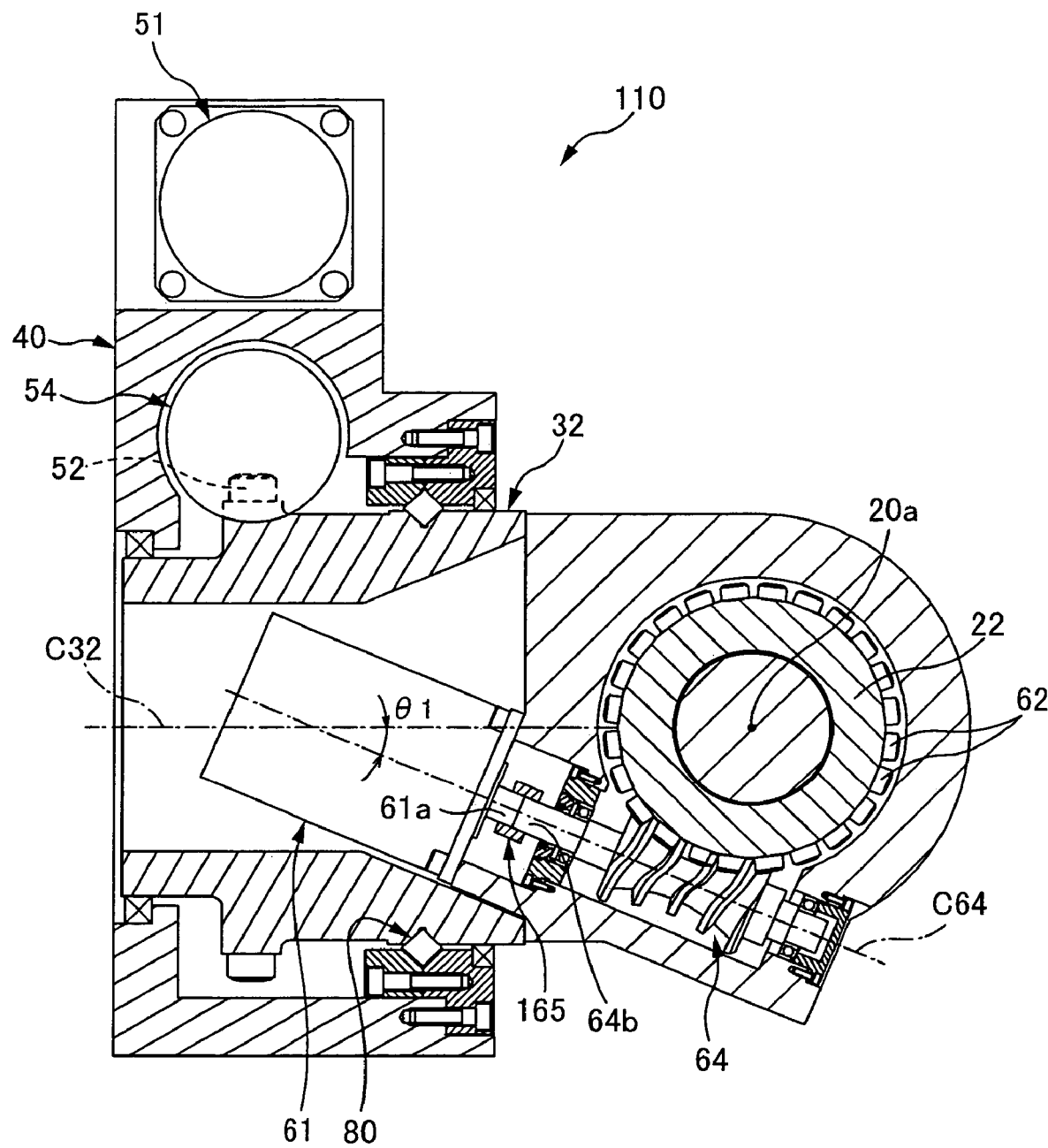
FIG. 9 is a horizontal sectional view showing a rotary table apparatus 110 according to a second embodiment.

FIG. 9 is a horizontal sectional view showing a rotary table apparatus 110 according to a second embodiment, and is shown using the same format as FIG. 6.

In the first embodiment, the drive-rotation shaft 61a of the second motor 61 and the globoidal cam 64, which relate to the second drive mechanism 60, were connected via rotation transmitting elements made up of a plurality of spur gears 65a, 65b, and 65c, as shown in FIG. 6. On the other hand, the rotation transmitting element according to the present second embodiment is a shaft coupling 165 as shown in FIG. 9. That is, the drive-rotation shaft 61a and the end 64b of the globoidal cam 64 are connected, side-by-side, by the shaft coupling 165 with their center of rotation being matched with one another.

With this structure, not only is it possible to eliminate backlash, which becomes a problem when adopting spur gears as a rotation transmitting element, but problems regarding frictional losses that arise when using, as the rotation transmitting element, a wound-type transmitting device made up of pulleys and an endless belt can also be eliminated. As a result, the precision of transmitting the drive-rotation force from the second motor 61 to the rotary table 20 becomes excellent.

In cases of using the shaft coupling 165 to achieve the connection, however, there is a restriction in arrangement in that it is necessary to make the outer circumferential surface of the globoidal cam 64 face the outer circumferential surface of the turret section 22 orthogonally. Since it is necessary for the second motor 61 to be accommodated approximately in the center of the hollow section S32 under such a restriction, the drive-rotation shaft 61a of the second motor 61 and the axis C64 of the globoidal cam 64 are arranged at an angle tilted by a predetermined angle θ1 from the axis C32 of the cylindrical shaft element 32, as shown in FIG. 9.

Figure 10:
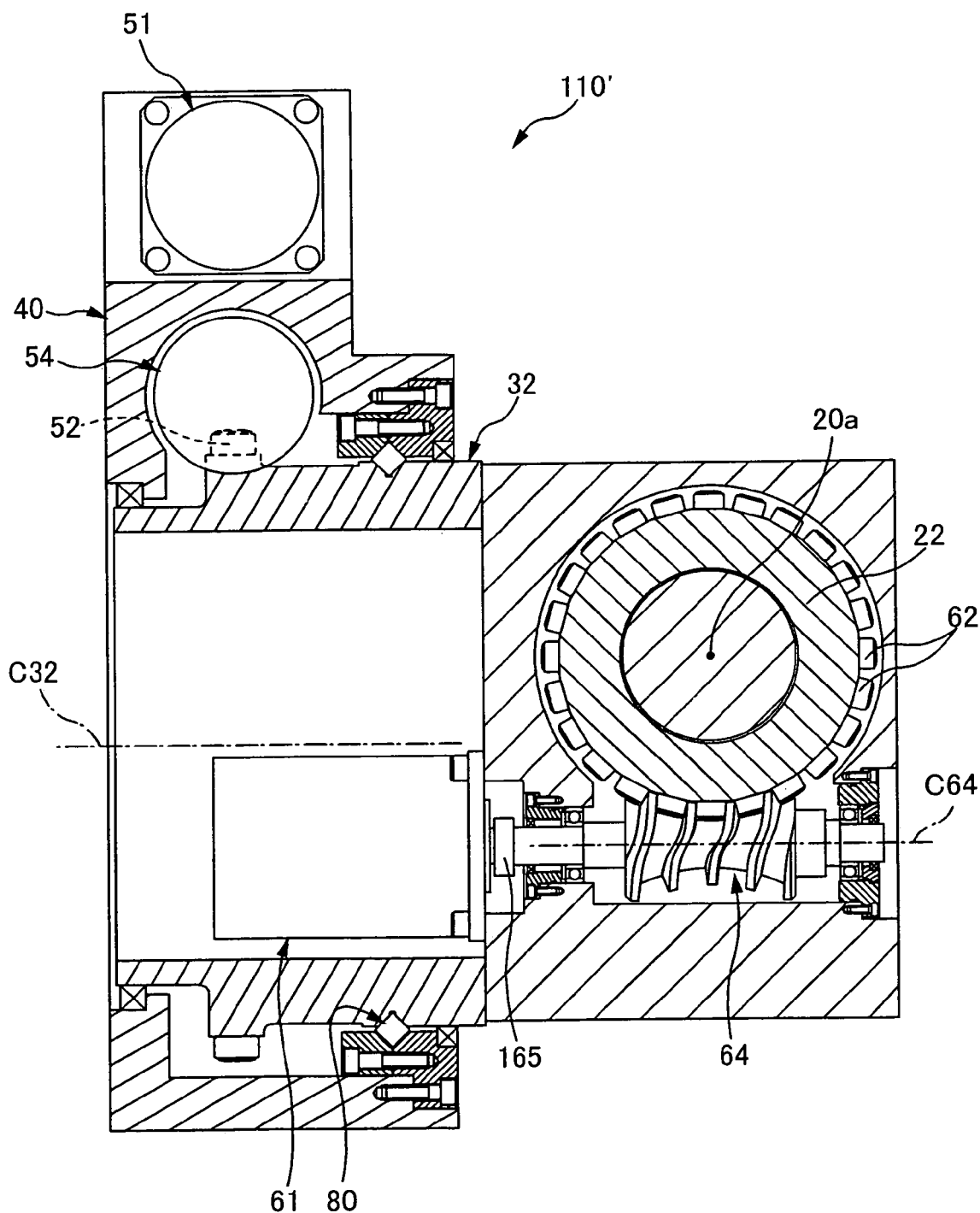
FIG. 10 is a diagram for comparing and describing the advantages of the rotary table apparatus 110 of the second embodiment.

It should be noted that by adopting the arrangement shown in FIG. 10, it is possible for the hollow section S32 to accommodate the second motor 61 while maintaining the drive-rotation shaft 61a of the second motor 61 and the axis C64 of the globoidal cam 64 parallel to the direction of the axis C32 of the cylindrical shaft element 32. In this case, however, the position where the second motor 61 is arranged is largely deviated from the center of the hollow section S32 toward the side. This calls for a large-diameter cylindrical shaft element 32 for accommodating the second motor 61 thus arranged. For this reason, such a configuration is not preferable in terms of downsizing of the rotary table apparatus 110'.

Examples of the shaft coupling 165 include sleeve couplings shown cut away in FIG. 9 (in-which the drive-rotation shaft 61a and the end 64b of the globoidal cam 64 are arranged side-by-side inside a sleeve member 165 and fixed with a key (not shown)) and flange couplings (in which a pair of flange members, each flange member fitted respectively on the drive-rotation shaft 61a and the end 64b of the globoidal cam 64, is fixed with a key, and the flange surfaces of these flange members are fastened with bolts and nuts), but other types of couplings may be used.

THIRD EMBODIMENT

Figure 11:
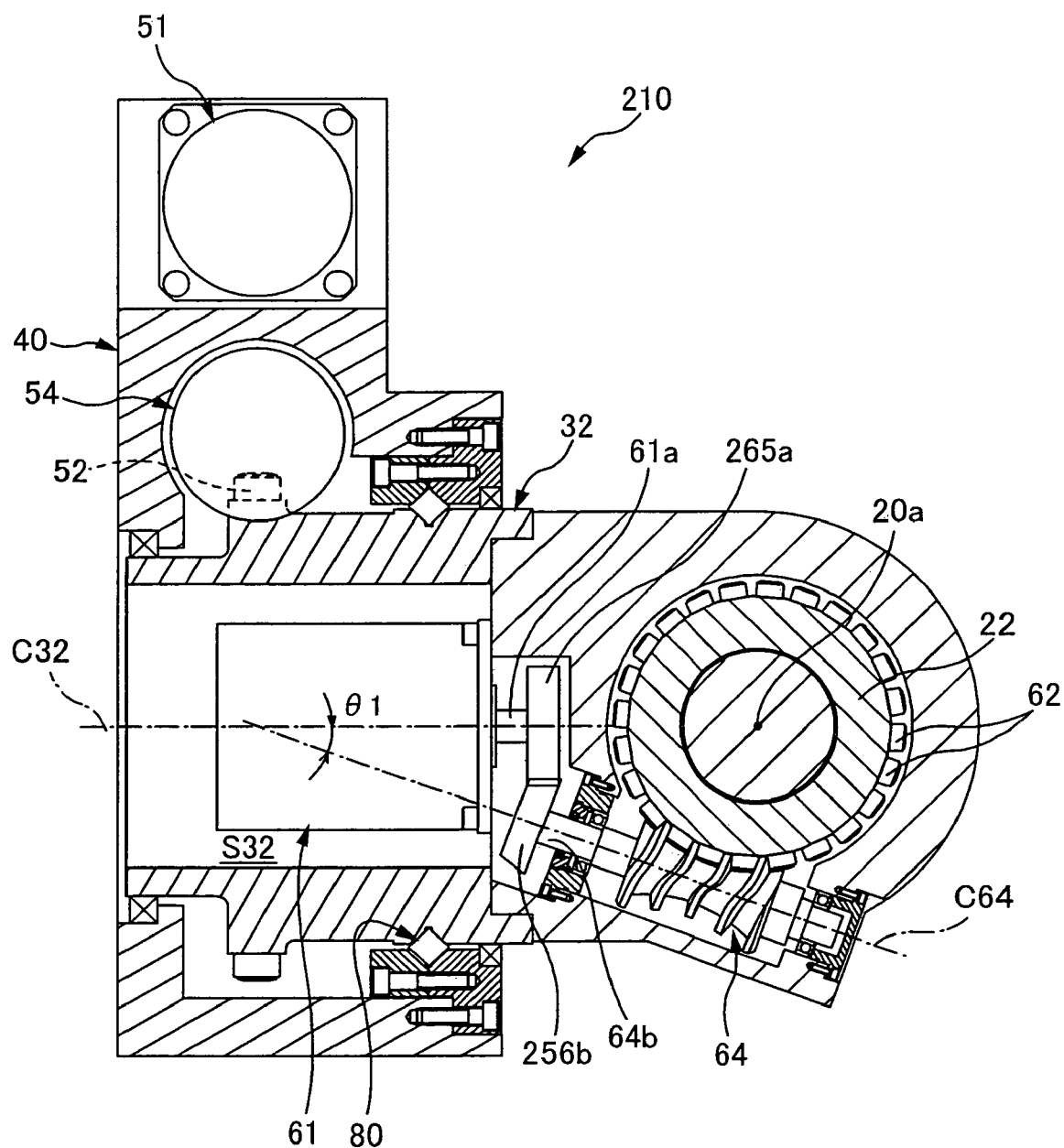
FIG. 11 is a horizontal sectional view showing a rotary table apparatus 210 according to a third embodiment.

FIG. 11 is a horizontal sectional view showing a rotary table apparatus 210 according to a third embodiment, and is shown using the same format as FIG. 6.

In the first and second embodiments, the axis C64 of the globoidal cam 64 and the drive-rotation shaft 61a of the second motor 61, which relate to the second drive mechanism 60, were parallel to one another as shown, for example, in FIG. 6. In the present third embodiment, however, the directions thereof are not parallel, as shown in FIG. 11. Since the arrangement is not restricted to the parallel arrangement, the degree of freedom in arranging the globoidal cam 64 and the second motor 61 is excellent.

More specifically, the second motor 61 is arranged in the center of the hollow section S32 with its drive-rotation shaft 61a matching the axis C32 of the cylindrical shaft element 32, as in the first embodiment. On the other hand, the globoidal cam 64 is arranged so that its axis C64 is tilted by a predetermined angle θ1 from the axis C32 of the cylindrical shaft element 32, as in the second embodiment. This tilted arrangement is achieved by adopting, in combination, a spur gear 265a and a bevel gear 265b as the rotation transmitting element. More specifically, the spur gear 265a is provided on the drive-rotation shaft 61a of the second motor 61 of the third embodiment, and the bevel gear 265b is provided on the end 64b of the globoidal cam 64. In this way, the rotational motion of the drive-rotation shaft 61a that rotates about the axis C32 of the cylindrical shaft element 32 is changed in direction into a rotational motion that takes, as its center, the direction tilted by the predetermined angle θ1 from the axis C32 of the cylindrical shaft element 32, and is then transmitted to the globoidal cam 64.

With such a configuration, it is not necessary for the axis C64 of the globoidal cam 64 and the drive-rotation shaft 61a of the second motor 61 to be aligned parallel to one another, and thus, it becomes possible to relax one of the arrangement restrictions.

FOURTH EMBODIMENT

Figure 12:
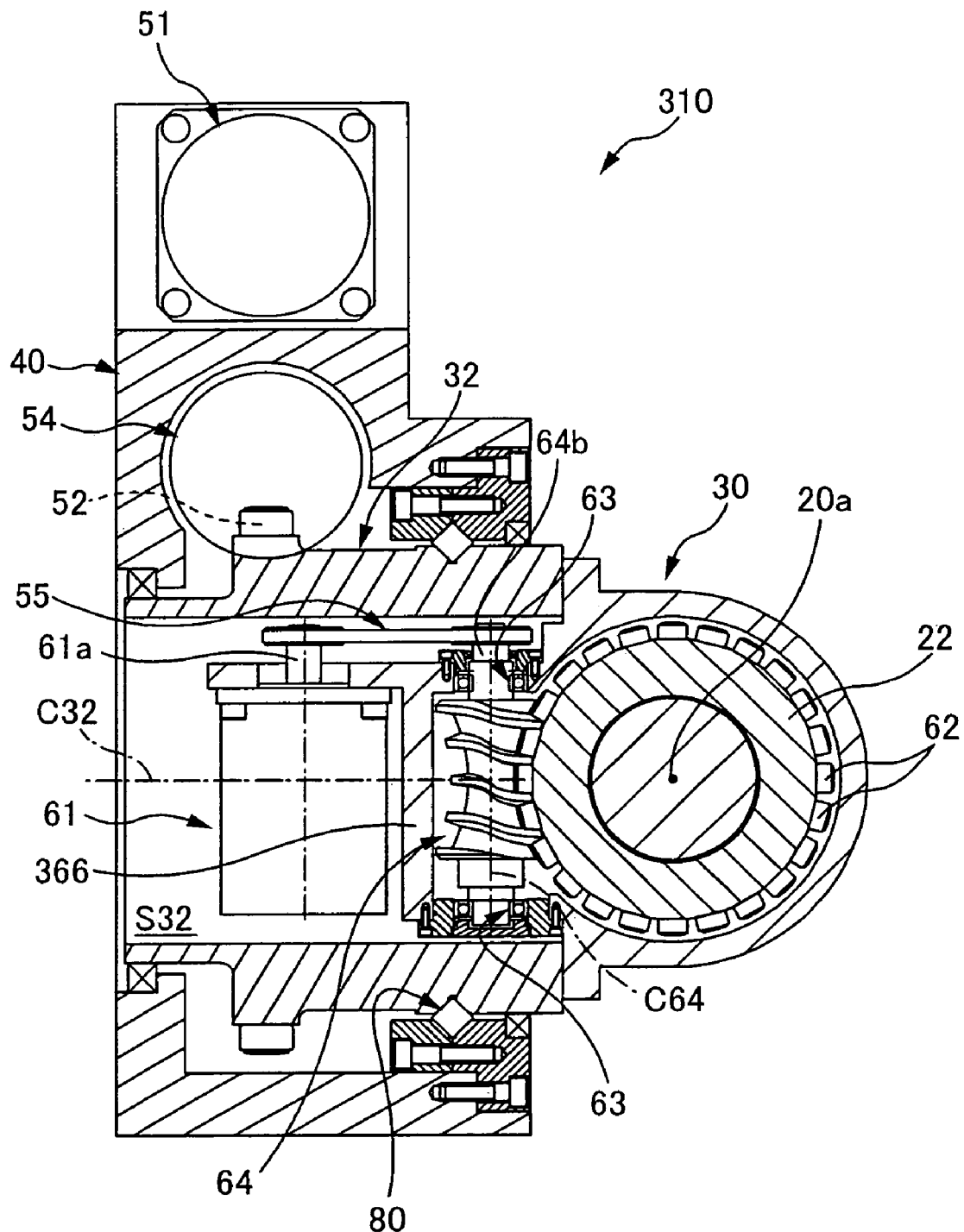
FIG. 12 is a horizontal sectional view showing a rotary table apparatus 310 according to a fourth embodiment.

FIG. 12 is a horizontal sectional view showing a rotary table apparatus 310 according to a fourth embodiment, and is shown using the same format as FIG. 6.

In the first through third embodiments, the globoidal cam 64 relating to the second drive mechanism 60 was accommodated inside the inner space S30 of the support rest 30 as shown, for example, in FIG. 6. In the present fourth embodiment, however, the globoidal cam 64 is accommodated inside the hollow section S32 of the cylindrical shaft element 32 along with the second motor 61 as shown in FIG. 12. As a result, only the cam followers 62 of the turret section 22 are accommodated inside the inner space S30 of the support rest 30, and in this way, it is possible to further reduce the support moment of the support rest 30. Further, since it is not necessary to accommodate the globoidal cam 64 inside the support rest 30, it is possible to change the outer shape (in a plan view) of the support rest 30 from the rectangular shape to a semicircular shape that matches the outer shape (in a plan view) of the turret section 22. In this way, the rotary table apparatus 310 can be made even smaller.

In accommodating the globoidal cam 64 inside the hollow section S32, since it is necessary to arrange the globoidal cam 64 so that its outer circumferential surface faces the outer circumferential surface of the turret section 22 orthogonally, the globoidal cam 64 is accommodated inside the hollow section S32 in a section closer to the support rest 30 with its axis C64 tilted by 90° from the direction of the axis C32 of the cylindrical shaft element 32. It should be noted that a bracket 366 is formed protruding from the support rest 30 into the hollow section S32, and both ends of the globoidal cam 64 are supported by a pair of bearings 63, 63 provided on the bracket 366.

Further, the second motor 61 is arranged inside the hollow section S32 in a section farther from the support rest 30 than the globoidal cam 64, and is bolted to the bracket 366. In this state of arrangement, the drive-rotation shaft 61a of the second motor 61 is positioned on the side of the end 64b of the globoidal cam 64, and is arranged parallel to the axis C64 of the globoidal cam 64. Therefore, a wound-type motion-transmitting device 55 made up of pulleys and an endless belt is used as a rotation transmitting element for transmitting the drive-rotation force from the second motor 61 to the globoidal cam 64. It is needless to say that a gear-wheel-type motion-transmitting device made up of a plurality of spur gears can be used as well.

OTHER EMBODIMENTS

Embodiments of the present invention were described above, but the present invention is not limited to those embodiments and, for example, can be modified as below:

(a) In the foregoing embodiments, all parts of the second drive mechanism 60 were accommodated inside the inner space S30 of the support rest 30 and the hollow section S32 of the cylindrical shaft element 32, but this is not a limitation. For example, a portion of the second drive mechanism 60 may be protruding outside the inner space S30 or the hollow section S32. In this case, however, articles in the periphery of the apparatus may bump into the protruding portion and damage it. Therefore, it is preferable that the second drive mechanism 60 is accommodated inside the inner space S30 and the hollow section S32 without any of its portions protruding therefrom, as in the foregoing embodiments.

(b) In the foregoing embodiments, the type of first and second motors 51 and 61 was not described in particular, but any type of motor may be used as long as the motor is provided with a drive-rotation shaft 51a, 61a that is driven to rotate according to the power that has been supplied. For example, it may be an electric motor in which the drive-rotation shaft 51a, 61a is rotated by electricity, or it may be a pneumatic motor or a hydraulic motor in which the drive-rotation shaft 51a, 61a is rotated using air or oil as the working fluid.

(c) In the foregoing embodiments, globoidal cams 54 and 64 were used as the cams of the first and second cam mechanisms, but this is not a limitation. For example, a cylindrical cam having, in its outer circumferential surface, a helical groove with which the cam followers 52, 62 engage may also be used.

(d) In the foregoing embodiments, the cylindrical shaft element 32 was formed protruding in the horizontal direction, which is an example of "sideward", and this horizontal cylindrical shaft element 32 was the turn axis 30a of the support rest 30, but this is not a limitation. For example, the cylindrical shaft element 32 may be formed protruding in a direction tilted by a predetermined angle from the horizontal direction, and this tilted cylindrical shaft element 32 may function as the rotation axis to turnably support the support rest 30. Instead, the cylindrical shaft element 32 may be formed protruding in the vertical direction, and not sideward, and this vertical cylindrical shaft element 32 may function as the turn axis to turnably support the support rest 30.,

What is claimed is:

1. A rotary table apparatus comprising: a support rest for rotatably supporting a rotary table; and
    a base for turnably supporting, in a cantilever fashion, said support rest by a shaft element that is protrudingly formed on said support rest being inserted into a hole provided in said base, said shaft element having formed therein a hollow section for accommodating at least a portion of a drive mechanism for rotating said rotary table,
    wherein said shaft element is formed protruding sideward from said support rest, wherein said rotary table has a rotation shaft protrudingly formed concentric with a center of rotation of said rotary table;
    wherein said rotation shaft is accommodated in an inner space provided in said support rest;
    wherein said inner space is in communication with said hollow section;
    wherein a motor that rotates a drive-rotation shaft thereof according to a power that has been supplied, and a cam mechanism for rotating said rotation shaft according to the rotation of said drive-rotation shaft are accommodated, as said drive mechanism, in said inner space and said hollow section, wherein said motor accommodated in said hollow section is supported by said support rest;
    wherein said cam mechanism accommodated in said inner space has cam followers that are provided on an outer circumferential surface of said rotation shaft along its circumferential direction at even intervals, and a cam that is rotatably supported on said support rest with its axis aligned with a direction orthogonal to said rotation shaft; and
    wherein said rotary table is rotated due to said motor rotating said cam, and said cam followers successively engaging with a cam surface formed in an outer circumferential surface of said cam.

2. A rotary table apparatus according to claim 1, wherein said shaft element is turnably supported about an axis thereof by a bearing installed to said hole; and wherein said drive mechanism is arranged extending across the position of installation of said bearing in the direction of said axis of said shaft element.

3. A rotary table apparatus according to claim 2, wherein said bearing is a cross roller bearing; and wherein, of among grooves in which rolling elements of said cross roller bearing roll, a groove on the side of said shaft element is formed directly in said shaft element.

4. A rotary table apparatus according to claim 1, wherein said motor and said cam mechanism are accommodated inside said inner space and said hollow section without any of their portions protruding outside from said inner space and said hollow section.

5. A rotary table apparatus according to claim 1,
    wherein said drive-rotation shaft of said motor is arranged parallel to an axis of said cam; and
    wherein a rotation transmitting element for transmitting the rotation of said drive-rotation shaft to said cam is provided between said drive-rotation shaft and said cam.

6. A rotary table apparatus according to claim 5, wherein said drive-rotation shaft of said motor is arranged aligned with the axis of said shaft element.

7. A rotary table apparatus according to claim 5, wherein said rotation transmitting element is a plurality of gears.

8. A rotary table apparatus according to claim 1, wherein said rotation shaft of said rotary table and the axis of said shaft element of said support rest are orthogonal to one another.

9. A rotary table apparatus according to claim 1,
    wherein said rotation shaft of said rotary table is supported on said support rest via a cross roller bearing; and
    wherein, of among grooves in which rolling elements of said cross roller bearing roll, a groove on the side of said rotation shaft is formed directly in said rotation shaft.

10. A rotary table apparatus according to claim 1,
    wherein said rotary table apparatus further comprises a drive mechanism for causing said support rest to turn about an axis of said shaft element;
    wherein said drive mechanism has cam followers that are provided on an outer circumferential surface of said shaft element along its circumferential direction at even intervals, a cam that is rotatably supported on said base with its axis aligned with a direction orthogonal to said shaft element, and a motor for rotating said cam; and
    wherein said support rest is turned with respect to said base due to said motor rotating said cam, and said cam followers successively engaging with a cam surface formed in an outer circumferential surface of said cam.

* * * * *

UNITED STATES PATENT AND TRADEMARK OFFICE
CERTIFICATE OF CORRECTION

PATENT NO. : 7,603,930 B2  
APPLICATION NO. : 11/250904  
DATED : October 20, 2009  
INVENTOR(S) : Kato et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Fifth Day of October, 2010

David J. Kappos  
*Director of the United States Patent and Trademark Office*